June 17, 1969

J. BURGESS 3,449,896

FRUIT PICKING DEVICE

Filed June 8, 1966

INVENTOR.
JAMES BURGESS
BY Edward M. Apple
ATTORNEY

# United States Patent Office 3,449,896
Patented June 17, 1969

3,449,896
FRUIT PICKING DEVICE
James Burgess, 6920 Yinger, Dearborn, Mich. 48126
Filed June 8, 1966, Ser. No. 556,122
Int. Cl. A01g 19/08
U.S. Cl. 56—339                            2 Claims

ABSTRACT OF THE DISCLOSURE

This application discloses a portable fruit picker. The invention resides in the particular combination and arrangement of the elements, which include a receptacle mounted on a pole. The receptacle having a slotted top member with a disposable razor blade, adjustably mounted across the slot for cutting the fruit stem and a padded bottom member for receiving the fruit after it has been cut from the tree.

---

This invention relates to apparatus for use in harvesting fruit and particularly apples.

An object of the invention is to provide a device which will enable a fruit picker to harvest the fruit while standing on the ground, and without the necessity of using ladders, picking baskets and the like.

In the orchard business it is common practice to provide picking baskets for the harvesters, which baskets are made of metal and have a fabric bottom which can be dumped when filled. With the use of such baskets the picker must climb a ladder in order to fill his basket. When the picking basket is full the picker descends the ladder and empties the picking basket into another container. Such practice necessitates many tiring and time consuming trips up and down the ladder, and the adroit balancing of the picking basket while on the ladder.

It is therefore an object of this invention to obviate the use of such equipment, and to provide a device whereby the picker may harvest the crop while standing on the ground.

Another object of the invention is to provide a device of the character indicated which is constructed and arranged with means for cutting the stems of the fruit, so that it may easily fall into the picking receptacle. This is particularly advantageous in picking certain types of apples which have tenacious stems, and particularly before the fruit is fully ripened.

Another object of the invention is to provide a picking receptacle which is mounted at the end of a comparatively long handle, and which is of such size that it will hold approximately three conventional sized apples before it needs to be emptied.

Another object of the invention is to provide a device of the character indicated which is constructed and arranged so that the fruit may fall into the picking container without danger of bruising the fruit.

Another object of the invention is the provision of a device of the character indicated which is provided with a handle which may be adjusted to different lengths, so that fruit may be picked from trees of different heights.

Another object of the invention is the provision of a device of the character indicated which is simple in construction, economical to manufacture and efficient in operation.

Another object of the invention is the provision of a device of the character indicated which may be used by unskilled labor and without the necessity of extensive training.

Another object of the invention is the provision of a device of the character indicated which enables the harvester to remove the fruit from the tree, without the necessity of giving the fruit a twisting motion, which is the preferred, expert, orchard practice in the handling of most varieties of apples.

Another object of the invention is the provision of a device of the character indicated which may be constructed of materials easily obtained on the open market, and which may be assembled without the necessity of special tools and the like.

The foregoing and other objects and advantages of the invention will become more apparent as the description proceeds, reference being made from time to time to the accompanying drawing, forming part of the within disclosure, in which drawing.

Figure 1:
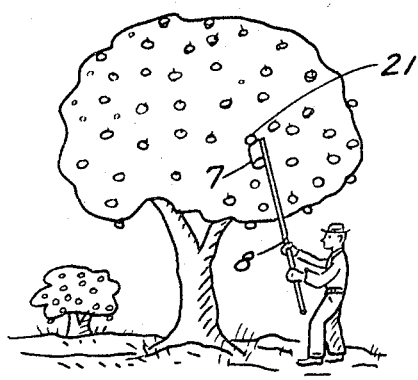
FIG. 1 is a perspective view of a fruit tree from which the fruit is being harvested by means of the device embodying the invention.
Figure 2:
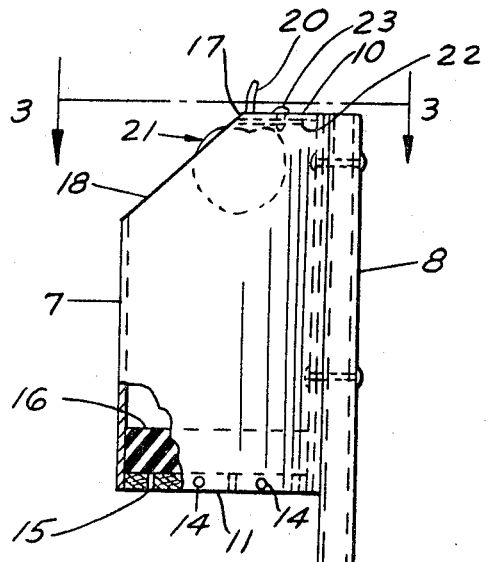
FIG. 2 is a fragmentary vertical section taken through the device shown in FIG. 1.

Referring now more particularly to the drawing, it will be understood that in the embodiment herein disclosed the reference character 7 indicates, in general, the picking receptacle which is mounted at the end of a handle member 8, which is preferably made of aluminum tubing and is formed in sections, which sections may be threaded together as at 9, so that the handle may be extended to any length sufficient to harvest fruit from the highest trees.

Figure 3:
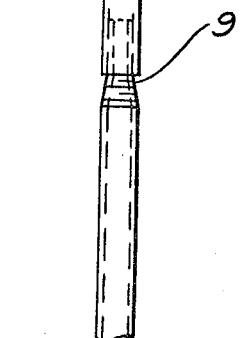
FIG. 3 is a top plan view of the device shown in FIG. 2.

The receptacle 7 is preferably of such size as to accommoderate at least three ordinary size apples, and is preferably formed with aluminum side walls and plywood top 10 and bottom 11. The side walls of the receptacle 7 are preferably made of a single length of aluminum, which is rolled into a cylinder with the edges overlapped as at 12 (FIG. 3). The overlapped edges of the cylinder are preferably secured to the handle 8 by means of rivets 13, or other suitable means, which extend through the overlapped walls and the handle. This makes a very simple method of construction which can be practiced by even an unskilled fabricator.

The plywood top 10 and plywood bottom 11 are preferably secured in position on the interior of the cylinder by screws 14, or other suitable means.

The bottom 11 may be provided with drain holes 15, so that excess moisture may be removed from the receptacle.

The bottom interior of the receptacle is provided with a foam rubber cushion 16, so that the fruit, particularly apples, will not be bruised as they drop to the interior of the receptacle.

The top closure member 10 and the front wall 7A are respectively provided with cutout portions 17 and 18 so that the fruit may be received therein.

It will be noted that the cutout portion 17 in the top 10 terminates in a recess 19 which is intended to accommodate the stem 20 of the fruit 21 (FIG. 3).

In order to quickly sever the stem 20 of the fruit, I provide a cutting element 22, which in this embodiment is a discarded razor blade, which is secured to the underface of the top closure member 10 by means of screws 23, or other suitable means. The cutting edge of the member 22 is positioned so that it intersects the recess 19 near its opening, as shown in FIG. 3.

The device is used as follows: The fruit picker first determines the height of the tree to be picked and then adjusts the length of the handle 8 to meet the requirements. The picker then maneuvers the receptacle 7 so that the fruit to be picked is received in the cutouts 17 and 18, and the stem 20 of the fruit 21 is received in the recess 19. As the stem of the fruit enters the recess 19 it is severed by the sharp cutting edge of the member 22 and will fall to the bottom of the receptacle. When the receptacle 7 is filled the device may then be lowered and the fruit may be rolled from the receptacle through the cutout portions 17 and 18 into a larger container, which may be a bushel basket, or a conventional bulk receptacle such as is now being used extensively in the orchard industry.

With the device hereinabove described a picker may easily harvest the fruit from a tree without the time consuming and fatiguing operations of ascending and descending a ladder with a bulky picking basket.

Having described my invention, what I claim and desire to secure by Letters Patent is:

1. In a device of the character described the combination of a highly portable aluminum receptacle having flat upper and lower closure members and an extendable handle having a portion thereof co-extensive with one side wall of said receptacle, said receptacle having an angular cut out section encompassing part of the upper end closure member and part of the other side wall of said receptacle for receiving an element of fruit, said upper closure member having a V shaped slot therein, a replaceable razor blade threadedly mounted across the narrow end of said slot for severing the stem of said fruit, and a padded element on the lower closure member for receiving said fruit.

2. The structure of claim 1, in which the V shaped slot in said upper closure member, has a narrow extension for receiving the stem of the fruit and said replaceable razor blade underlies a portion of said extension.

References Cited

UNITED STATES PATENTS

| 65,279 | 5/1867 | Rogers | 56—339 |
|---|---|---|---|
| 462,386 | 11/1891 | Reno et al. | 56—339 |
| 929,647 | 8/1909 | Andersen | 56—340 |
| 1,088,295 | 2/1914 | Quick et al. | 56—340 |
| 1,109,645 | 9/1914 | Slatton | 56—338 |
| 1,191,954 | 7/1916 | Elkins | 56—336 |
| 1,307,417 | 6/1919 | Powers | 56—335 |
| 1,501,007 | 7/1924 | Leonard | 56—340 |
| 1,588,034 | 6/1926 | Koehler | 56—339 |

RUSSELL R. KINSEY, *Primary Examiner.*